(12) United States Patent
Ozaki

(10) Patent No.: US 8,950,528 B2
(45) Date of Patent: Feb. 10, 2015

(54) ELECTRIC AUTOMOBILE

(75) Inventor: Takayoshi Ozaki, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/000,295

(22) PCT Filed: Feb. 10, 2012

(86) PCT No.: PCT/JP2012/053061
§ 371 (c)(1),
(2), (4) Date: Aug. 19, 2013

(87) PCT Pub. No.: WO2012/114902
PCT Pub. Date: Aug. 30, 2012

(65) Prior Publication Data
US 2013/0320747 A1    Dec. 5, 2013

(30) Foreign Application Priority Data

Feb. 25, 2011 (JP) ................................. 2011-039854
Feb. 25, 2011 (JP) ................................. 2011-039855

(51) Int. Cl.
*B60W 10/08* (2006.01)
*H02P 29/00* (2006.01)
(Continued)

(52) U.S. Cl.
CPC ........... *H02P 29/0055* (2013.01); *B60L 3/0061* (2013.01); *B60K 7/0007* (2013.01); *H02P 29/0088* (2013.01); *B60L 2240/425* (2013.01); *Y02T 10/642* (2013.01)
USPC ..................... 180/65.285; 180/65.51; 318/641

(58) Field of Classification Search
USPC ................. 180/65.51, 65.285, 65.29; 318/641
See application file for complete search history.

(56) References Cited

U.S. PATENT DOCUMENTS

| 7,120,037 | B2 * | 10/2006 | Komatsu et al. | 363/37 |
| 7,245,094 | B2 * | 7/2007 | Shinmura et al. | 318/139 |
| 7,663,329 | B2 * | 2/2010 | Muta | 318/432 |

(Continued)

FOREIGN PATENT DOCUMENTS

| JP | 11-341884 | 12/1999 |
| JP | 2003-304604 | 10/2003 |

(Continued)

OTHER PUBLICATIONS

PCT International Preliminary Report on Patentability mailed Sep. 6, 2013 in corresponding International Application No. PCT/JP2012/053061.

(Continued)

*Primary Examiner* — Jeffrey J Restifo

(57) ABSTRACT

An electric vehicle includes a motor unit to drive a wheel. The electric vehicle also includes a control system that controls the motor unit. The control system includes an inverter. The electric vehicle also includes a temperature sensor to sense temperature Tmc of the motor coils of the motor unit or a temperature sensor to sense temperature Tic of the inverter. The electric vehicle also includes a limiter to, if the temperature Tmc sensed by the sensor exceeds a motor coils temperature threshold, reduce a motor current of the unit until a derivative dTmc/dt of the sensed temperature Tmc with time t drops to zero or below, or to, if the temperature Tic sensed by the sensor exceeds an inverter temperature threshold, limit a current command to the inverter until a derivative dTic/dt of the sensed temperature Tic with time t drops to zero or below.

6 Claims, 10 Drawing Sheets

(51) Int. Cl.
*B60L 3/00* (2006.01)
*B60K 7/00* (2006.01)

(56) References Cited

U.S. PATENT DOCUMENTS

| | | | |
|---|---|---|---|
| 7,755,313 B2* | 7/2010 | Son et al. | 318/432 |
| 7,857,509 B2* | 12/2010 | Ward et al. | 374/152 |
| 7,859,207 B2* | 12/2010 | Yamada et al. | 318/400.02 |
| 7,952,236 B2* | 5/2011 | Mitsutani | 307/117 |
| 8,027,181 B2* | 9/2011 | Hamatani | 363/98 |
| 8,127,564 B2* | 3/2012 | Takamatsu et al. | 62/239 |
| 8,220,574 B2* | 7/2012 | Nozawa | 180/65.275 |
| 8,244,427 B2* | 8/2012 | Weiss et al. | 701/29.7 |
| 8,353,172 B2* | 1/2013 | Hattori et al. | 62/157 |
| 8,360,185 B2* | 1/2013 | Ogata | 180/65.51 |
| 8,581,533 B2* | 11/2013 | Hayashi et al. | 318/400.23 |
| 8,582,335 B2* | 11/2013 | Hasegawa et al. | 363/132 |
| 8,596,393 B2* | 12/2013 | Yoshizue et al. | 180/65.51 |
| 8,616,315 B2* | 12/2013 | Kim et al. | 180/65.51 |
| 8,674,637 B2* | 3/2014 | Kamijo | 318/400.3 |
| 8,712,618 B2* | 4/2014 | Kono et al. | 701/22 |
| 2006/0180365 A1* | 8/2006 | Innami et al. | 180/65.5 |
| 2011/0288723 A1* | 11/2011 | Weiss et al. | 701/34 |
| 2012/0217795 A1* | 8/2012 | Hasegawa et al. | 307/9.1 |
| 2013/0320747 A1* | 12/2013 | Ozaki | 301/6.5 |
| 2013/0341109 A1* | 12/2013 | Ozaki | 180/65.51 |
| 2014/0070739 A1* | 3/2014 | Luedtke | 318/400.02 |
| 2014/0088812 A1* | 3/2014 | Kobayashi et al. | 701/22 |
| 2014/0100731 A1* | 4/2014 | Ono | 701/22 |

FOREIGN PATENT DOCUMENTS

| | | |
|---|---|---|
| JP | 2008-168790 | 7/2008 |
| JP | 2012-178912 | 9/2012 |
| JP | 2012-178918 | 9/2012 |
| JP | 2013-243930 | 12/2013 |
| JP | 2013-252051 | 12/2013 |

OTHER PUBLICATIONS

U.S. Appl. No. 14/000,373, filed Aug. 19, 2013, Takayoshi Ozaki, NTN Corporation.
U.S. Appl. No. 13/985,925, filed Aug. 16, 2013, Takayoshi Ozaki, NTN Corporation.
U.S. Appl. No. 14/000,364, filed Aug. 19, 2013, Takayoshi Ozaki, NTN Corporation.
U.S. Appl. No. 14/000,379, filed Aug. 19, 2013, Takayoshi Ozaki, NTN Corporation.
U.S. Appl. No. 14/000,783, filed Aug. 21, 2013, Takayoshi Ozaki, NTN Corporation.
International Search Report mailed May 15, 2012 in corresponding International Application No. PCT/JP2012/053061.
Japanese Notice of Reason(s) for Rejection issued May 27, 2014 in corresponding Japanese Application No. 2011-039854.
Japanese Notice of Reason(s) for Rejection issued May 27, 2014 in corresponding Japanese Application No. 2011-039855.
Japanese Notice of Reason(s) for Rejection issued May 27, 2014 in corresponding Japanese Application No. 2013-160038.
Japanese Notice of Reason(s) for Rejection issued May 27, 2014 in corresponding Japanese Application No. 2013-160039.

* cited by examiner

ELECTRIC AUTOMOBILE

CROSS REFERENCE TO THE RELATED APPLICATIONS

This application is a U.S. national stage application of PCT/JP2012/053061, filed Feb. 10, 2012, and claims foreign priority benefit of Japanese patent application No. 2011-039854 and No. 2011-039855, both filed Feb. 25, 2011 in the Japanese Intellectual Property Office, the entire disclosures of which are herein incorporated by reference as a part of this application.

BACKGROUND OF THE INVENTION

1. Field of the Invention

The present invention relates to an electric vehicle, such as an in-wheel motor vehicle, that is equipped with motor(s) to drive wheels and that may be battery-powered or fuel cell-powered.

2. Description of Related Art

An electric vehicle may experience degradation in performance or malfunctions of a motor serving as a drive for the vehicle. This can significantly affect the travel performance or travel safety. A battery-powered electric vehicle may include a drive system. The drive system may employ an IPM (e.g., Interior Permanent Magnet synchronous motor). Such an IPM may include a neodymium magnet to provide a highly efficient performance, thus increasing the maximum travel range that is possible with a limited battery capacity.

An electric vehicle can typically include a synchronous motor or an induction motor that may be driven with an AC current converted by an inverter from a DC current supplied from a battery. The inverter, which can, in principle, include a plurality of semiconductor switching devices, may conduct a large current to drive the motor, thus generating a significant heat. The characteristics of semiconductor switching devices may considerably vary with temperature. Overheat may even damage the semiconductor switching devices. In order to address these, an inverter is typically equipped with a cooling system.

In the past, an in-wheel motor drive system has been proposed in which, to ensure reliability, the temperature of components such as a wheel bearing, a reducer and a motor may be measured and monitored for overload, with features to limit a drive current in/to the motor or a rotational frequency of the motor according to the temperature measurements (see the Patent Document 1 listed below).

[Patent Document 1] JP Laid-open Patent Publication No. 2008-168790

SUMMARY OF THE INVENTION

The driving conditions of an electric vehicle may constantly change, resulting in significant fluctuations of the rotational frequency of a motor and/or the current flow in motor coils. An electric vehicle may be an in-wheel electric vehicle. A motor mounted to an in-wheel electric vehicle may have to operate in a severe environment. For example, such a motor may be constantly subject to externally-induced vibrations because it is positioned below suspension springs or it is unsprung. An electric vehicle may be driven for a continuous time with a higher torque generated by a motor operating in such a severe environment, in order to, for example, go up a slope. This leads to increase in the temperature of a motor, possibly deteriorating the insulation on the motor coils. Thus, managing the temperature of a motor can be a key to achieving the travel safety of a vehicle.

As noted above, an inverter for an electric vehicle is typically equipped with a cooling system. Such a cooling system can prevent excessive increase of temperature during a normal operation. However, an electric vehicle is often driven for a continuous time with a higher torque in order to, for example, go up a slope. In such a case, an inverter may cause overheat by conducting a large current. This may undesirably change the characteristics of the inverter and/or even damage the inverter. This, in turn, may lead to undesirable change in the control characteristics of the driving of a motor and/or lead to a situation where the driving of a motor is impossible.

As discussed earlier, an in-wheel motor drive system may be configured such that the temperature of a motor or an inverter is measured and monitored for overload, in order to impose a corresponding limit on a current used to drive the motor. Such a configuration, however, may drastically hinder the driving of a vehicle.

An object of the present invention is to provide an electric vehicle which can manage the temperature of a motor unit without drastically hindering the driving of the vehicle, prevent the change of characteristics of an inverter and/or a damage to the inverter that may be caused by overheat, thus preventing undesirable change in the control characteristics of the driving of the motor unit and/or preventing a situation where the driving of the motor unit is impossible, and/or enable appropriate measures to be promptly taken. The general aspects of the present invention will now be described using the reference signs in the figures showing embodiments of the present invention.

The present invention may provide an electric vehicle which includes a motor unit 6 configured to drive a wheel 2. The motor unit 6 includes motor coils 78. The electric vehicle also includes a control system U1 that controls the motor unit 6. The control system U1 includes an inverter 31. The electric vehicle also includes a temperature sensor Sma that is associated with the motor coils 78 of the motor unit 6 and is configured to sense temperature Tmc of the motor coils 78 or a temperature sensor Sia that is associated with the inverter 31 and is configured to sense temperature Tic of the inverter 31. The electric vehicle also includes a limiter configured to, if the temperature Tmc sensed by the temperature sensor Sma exceeds a motor coils temperature threshold, reduce a motor current of the motor unit 6 until a derivative dTmc/dt of the sensed temperature Tmc with time t drops to zero or below, or to, if the temperature Tic sensed by the temperature sensor Sia exceeds an inverter temperature threshold, limit a current command to the inverter 31 until a derivative dTic/dt of the sensed temperature Tic with time t drops to zero or below. The limiter used in this context refers to a motor current reducer 95 or an inverter limiter 102.

In the aforementioned configuration, the temperature sensor Sma may continuously sense the temperature Tmc of the motor coils 78 of the motor unit 6, and the temperature sensor Sia may continuously sense the temperature Tic of the inverter 31. The electric vehicle may be driven for a continuous time with a higher torque in order to, for example, go up a slope. This can lead to increase in the temperature Tmc (Tic) of the motor coils 78 and the inverter 31. The limiter may determine if the sensed temperature Tmc (Tic) exceeds a predefined threshold.

In a configuration where the limiter is a motor current reducer 95, the motor current reducer 95 may, upon determining that the sensed temperature Tmc exceeds the motor coils temperature threshold, carry out control that reduces the motor current of the motor unit 6. Subsequently, the motor current reducer 95 may, upon detecting the sign that the rate of change of the sensed temperature Tmc is dropping to zero or below or if the rate of increase of the temperature represented by the aforementioned dTmc/dt drops to zero or below, stop carrying out the control that reduces the motor current, without waiting for the sensed temperature Tmc itself to drop down to a certain value. This prevents drastic hindrance of the driving of the motor unit 6.

If the sensed temperature Tmc of the motor coils 78 begins to increase once the motor current reducer 95 stops carrying out the aforementioned control, the motor current reducer 95 may, once the sensed temperature Tmc equals or exceeds the motor coils temperature threshold, resume carrying out the control that reduces the motor current of the motor unit 6. Subsequently, the motor current reducer 95 may, if the aforementioned rate of increase of the temperature drops to zero or below, stop carrying out the control that reduces the motor current. This ensures that overload is avoided.

In a configuration where the limiter is an inverter limiter 102, the inverter limiter 102 may determine if the sensed temperature Tic exceeds a predefined inverter temperature threshold. The inverter limiter 102 may, upon determining that the sensed temperature Tic exceeds the inverter temperature threshold, carry out control that limits a current command to the inverter 31. In a particular embodiment, the control may cause change in at least one of duty cycle and pulse number. For example, the control that limits a current command to the inverter 31 may include reduction of a duty cycle, which indicates pulse ON time per switching period, below a predefined duty cycle, thus reducing effective voltage value, or may include generation of pulses of unequal width while maintaining a switching period.

Subsequently, the inverter limiter 102 may, upon detecting the sign that the rate of change of the sensed temperature Tic is dropping to zero or below or if the rate of increase of the temperature represented by the aforementioned dTic/dt drops to zero or below, stop carrying out the control that limits a current command to the inverter 31, without waiting for the sensed temperature Tic itself to drop down to a certain value. This can avoid excessive reduction of a motor current, thus preventing drastic hindrance of the driving of the motor unit 6. If the sensed temperature Tic of the inverter 31 begins to increase after the inverter limiter 102 stops carrying out the aforementioned control, the inverter limiter 102 may, once the sensed temperature Tic equals or exceeds the inverter temperature threshold, resume carrying out the control that limits a current command to the inverter 31. Subsequently, the inverter limiter 102 may, if the aforementioned rate of increase of the temperature drops to zero or below, stop carrying out the control that limits a current command to the inverter 31. This ensures that overload is avoided. In this way, the change of characteristics of the inverter 31 and/or a damage to the inverter 31 that may be caused by overheat can be prevented, thus preventing undesirable change in the control characteristics of the driving of the motor unit and/or preventing a situation where the driving of the motor unit is impossible.

The control system U1 may include an ECU which is an electronic control unit configured to perform general control of the vehicle and may also include an inverter unit 22, with the inverter unit 22 including a power circuitry 28 which includes the inverter 31 and also including a motor control circuitry 29 configured to control at least the power circuitry 28 in accordance with control from the ECU 21, wherein the inverter may be configured to convert a DC power from a battery unit into an AC power used to drive the motor unit.

The motor control circuitry 29 may include the limiter 95 (102), wherein the limiter may include a determiner 39 (39A) configured to determine if the temperature Tmc (Tic) sensed by the temperature sensor Sma (Sia) exceeds the motor coils temperature threshold or the inverter temperature threshold and may also include a controller 40 (40A) configured to send to the power circuitry 28, if it is determined that the sensed temperature Tmc (Tic) exceeds the motor coils temperature threshold or the inverter temperature threshold, a command that reduces the motor current of the motor unit 6 or a command that limits the current command to the inverter 31.

With a configuration where the motor control circuitry 29 of the inverter unit 22 includes the limiter which may be the motor current reducer 95 or the inverter limiter 102, the motor current reducer 95 or the inverter limiter 102 that may make the aforementioned determination based on the sensed temperature is positioned closer to the motor unit 6 than with a configuration where the ECU 21 includes the limiter, thus the former configuration being more advantageous in terms of wire routing. Also, with a configuration where the motor control circuitry 29 of the inverter unit 22 includes the limiter, an appropriate control can be initiated more quickly than with a configuration of the ECU 21 including the limiter, thus promptly avoiding various driving problems. Furthermore, with the former configuration, the load on the ECU 21, whose complexity is increasing hand-in-hand with its sophistication, can be reduced.

The inverter unit 22 may include an abnormalities notifier 41 configured to send to the ECU 21 a notification of abnormalities of the motor unit 6 if the determiner 39 determines that the sensed temperature exceeds the motor coils temperature threshold or a notification of abnormalities of the inverter 31 if the determiner 39A determines that the sensed temperature exceeds the inverter temperature threshold. The ECU 21 performs general, integrated control of the vehicle. Thus, by sending to the ECU 21 a notification of abnormalities of the motor unit 6 if it is found, with the motor current reducer 95 that may be included in the inverter unit 22, that there is abnormalities of the motor coils 78 or by sending to the ECU 21 a notification of abnormalities of the inverter 31 if it is found, with the inverter limiter 102 that may be included in the inverter unit 22, that there is abnormalities of the inverter 31, the ECU 21 can correspondingly perform an appropriate control of the vehicle in general. Also, the ECU 21 is an upper-level control unit which may send a drive command to the inverter unit 22. Thus, an urgent control performed by the inverter unit 22 may be followed by a more appropriate control of drive which is performed by the ECU 21. In some embodiments, the ECU 21 may include the motor current reducer 95 or the inverter limiter 102.

A wheel bearing unit 4 and a reducer unit 7 may further be provided, wherein the motor unit 6, together with the wheel bearing unit 4 and the reducer unit 7, may form an in-wheel motor drive system 8 that is partly or entirely disposed within the wheel 2. Reliability of the wheel bearing unit 4, the reducer unit 7 and the motor unit 6 is an urgent concern for an in-wheel motor drive system 8 which, due to its smaller size, has less materials used, involves rapid rotation of the motor unit 6, and etc. Sensing the temperature of the motor coils 78 and continuously monitoring the motor coils 78 for abnormalities such as deterioration of insulation enables responsive control that appropriately reduces the motor current of the motor unit 6. In addition or alternatively, sensing the temperature of the inverter 31 and continuously monitoring the inverter 31 for abnormalities that may be caused by overheat, such as thermal runaway caused by overheat of semiconductor switching devices enables responsive control that appropriately limits a current command to the inverter 31.

A reducer unit 7 may be provided which is configured to produce rotation with a speed that is reduced with respect to that of rotation of the motor unit 6, wherein the reducer unit 7 may comprise a cycloidal reducer. Such a configuration in which the reducer unit 7 comprises a cycloidal reducer having, for example, a reduction ration of 1/6 or greater, allows for the provision of a smaller motor unit 6, thus achieving reduction in dimensions of the system or assembly. With such a significant reduction ratio, a smaller motor unit 6 may involve rapid rotation. Even when a motor unit 6 is undergoing rapid rotation, the change of characteristics of an inverter 31 and/or a damage to the inverter 31 can be prevented, thus preventing undesirable change in the control characteristics of the driving of the motor unit and/or preventing a situation where the driving of the motor unit is impossible. This enables avoiding a situation where driving of a vehicle is suddenly impossible.

The present invention encompasses any combination of at least two features disclosed in the claims, the specification and/or the drawings. In particular, the present invention encompasses any combination of at least two claims.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, as defined by the appended claims. In the accompanying drawings, like reference numerals are used to denote like parts throughout the several views, and:

DESCRIPTION OF THE EMBODIMENTS

Figure 1:
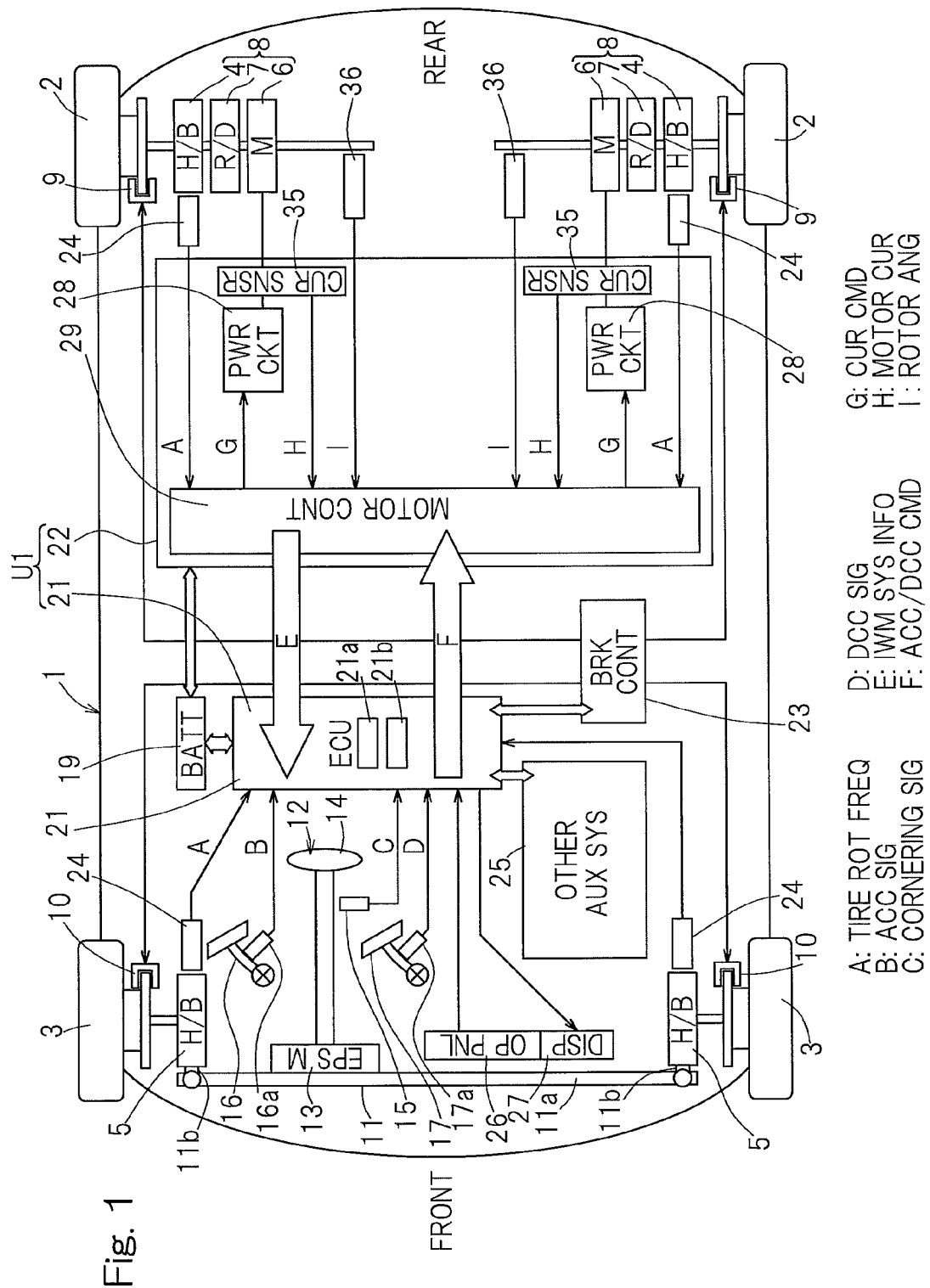
FIG. 1 is a block diagram of a schematic configuration of an electric vehicle, as viewed from top, according to the first embodiment of the present invention.

An electric vehicle according to the first embodiment of the present invention will now be described in connection with FIG. 1 to FIG. 8. The illustrated electric vehicle is a four-wheel vehicle that includes a vehicle body 1 with left and right rear wheels 2 and left and right front wheels 3, with the rear wheels 2 being drive wheels and the front wheels 3 being steered driven wheels. The drive wheels 2 and the driven wheels 3, both equipped with tires, are supported by the vehicle body 1 via respective wheel bearing units 4, 5. In FIG. 1, the wheel bearing units 4, 5 are labeled with "H/B" which is an abbreviation for hub bearing. The left and right drive wheels 2, 2 are driven by respective independent traction motor units 6, 6. Rotation of a motor unit 6 is transmitted via a reducer unit 7 and a wheel bearing unit 4 to a wheel 2. The motor unit 6, the reducer unit 7 and the wheel bearing unit 4 are integrally assembled with each other to form an in-wheel motor drive system 8 that is partly or entirely disposed within the wheel 2. The in-wheel motor drive system 8 may be referred to as an in-wheel motor unit. The motor unit 6 may, without the interposition of the reducer unit 7, directly drive the wheel 2 into rotation. The wheels 2, 3 are equipped with respective electromechanical brakes 9, 10.

The left and right front steered wheels 3, 3 are turnable via a turning mechanism 11 and are steered with a steering mechanism 12. The turning mechanism 11 includes left and right knuckle arms 11b, 11b holding the respective wheel bearing units 5 and also includes a tie rod structure 11a configured to be laterally displaced to change the angles of the left and right knuckle arms 11b, 11b. The lateral movement of the turning mechanism 11 may be caused by a command from the steering mechanism 12, which drives an EPS (Electric Power Steering) motor 13, and via a rotary to linear motion converter mechanism (not shown). A steering angle sensor 15 is configured to sense a steering angle. The output of the steering angle sensor 15 is sent to the ECU 21 in which the sensed information may be used to generate an accelerating/decelerating command for left and right wheels.

Figure 5:
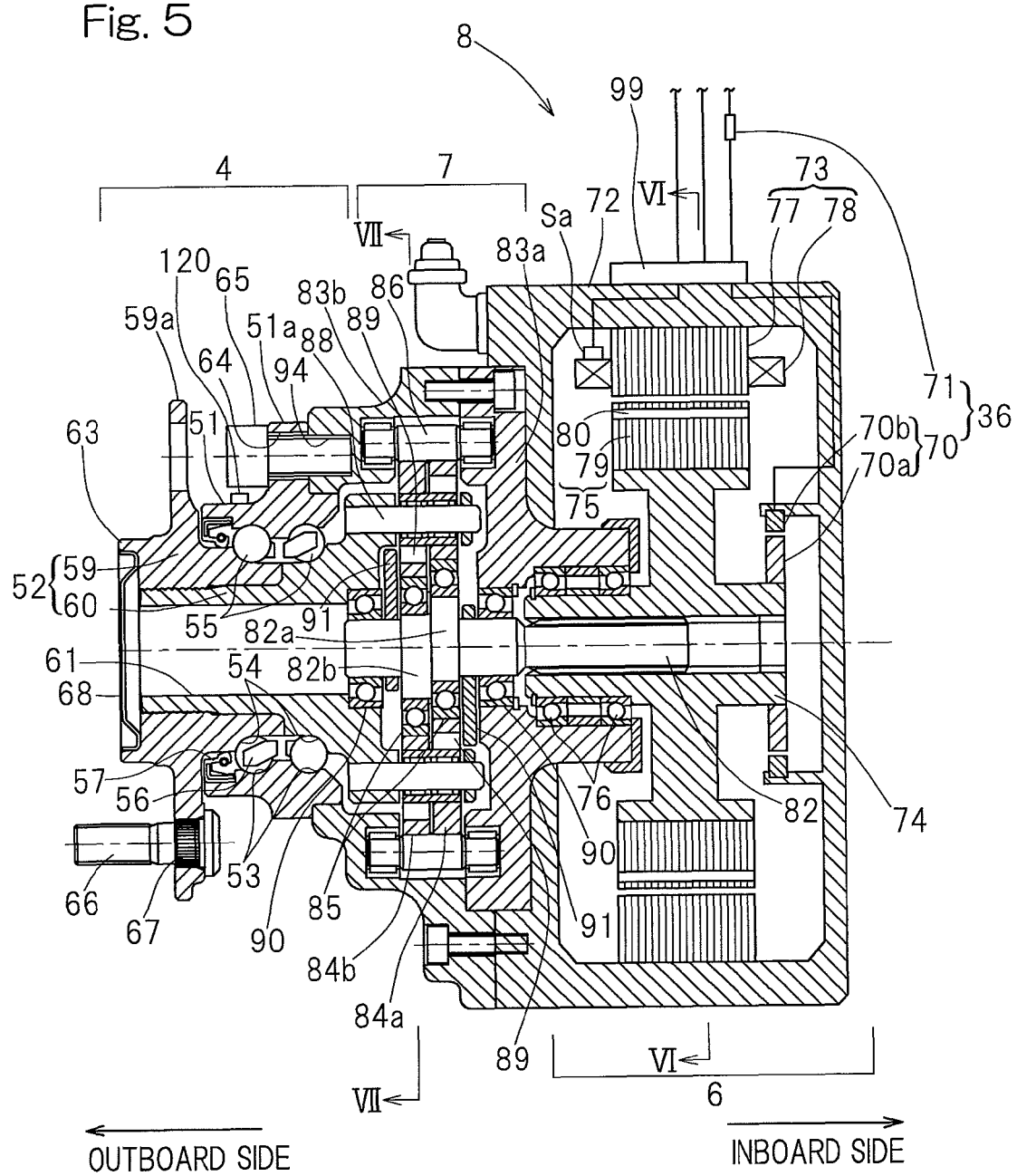
FIG. 5 is a front cut-away view of an in-wheel motor drive system for the electric vehicle shown in FIG. 1.

As shown in FIG. 5, the in-wheel motor drive system 8 includes a wheel bearing unit 4, a motor unit 6 and a reducer unit 7 interposed between the wheel bearing unit 4 and the motor unit 6, in which the hub of a drive wheel 2 (FIG. 2) supported by the wheel bearing unit 4 is coaxially coupled with a rotational output shaft 74 of the motor unit 6 (FIG. 5). Preferably, the reducer unit 7 has a reduction ratio of 1/6 or greater. The illustrated reducer unit 7 includes a cycloidal reducer which includes a rotational input shaft 82 coaxially connected to the rotational output shaft 74 of the motor unit 6. The rotational input shaft 82 has eccentric segments 82a, 82b. The cycloidal reducer also includes curvilinear plates 84a, 84b mounted via respective bearings 85 to the eccentric segments 82a, 82b, in such a way to transmit the eccentric motions of the curvilinear plates 84a, 84b in the form of a rotary motion to the wheel bearing unit 4. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

The wheel bearing unit 4 includes an outer member 51 having an inner periphery formed with a plurality of rows of raceway surfaces 53, an inner member 52 having an outer periphery formed with raceway surfaces 54 held in face to face relation to those raceway surfaces 53, and a plurality of rows of rolling elements 55 that are interposed between the raceway surfaces 53 of the outer member 51 and the raceway surfaces 54 of the inner member 52. The inner member 52 concurrently serves as a hub for mounting a drive wheel. The illustrated wheel bearing unit 4 includes a double row angular contact ball bearing, in which the rolling elements 55 are in the form of balls rollingly retained by a retainer 56 that is provided one for each row of the balls. The raceway surfaces 53 and 54 have arcuate cross sectional shapes and are formed to have respective contact angles held in back-to-back relation with each other. The outer member 51 and the inner member 52 define an annular bearing space therebetween, and an outboard end of the annular bearing space is sealed by a sealing member 57.

The outer member 51, which serves as a stationary member, is of one piece construction having a flange 51a for attaching to an outboard housing 83b of the reducer unit 7. The flange 51a has bolt insertion holes 64 formed at a plurality of circumferential locations thereof. The housing 83b has bolt receiving holes 94 that are internally threaded at locations thereof corresponding to the respective bolt insertion holes 64. The outer member 51 can be mounted to the housing 83b by screwing into the bolt receiving holes 94 the mounting bolts 65 that are pre-inserted in the bolt insertion holes 64.

The inner member 52, which serves as a rotational member, includes an outboard member 59 having a hub flange 59a for attaching a wheel. The inner member 52 also includes an inboard member 60 which has an outboard side fitted to an inner periphery of the outboard member 59 and which is crimped to be integrated with the outboard member 59. The outboard member 59 and the inboard member 60 have the corresponding rows of the raceway surfaces 54 formed thereon. The inboard member 60 has a center thereof formed with a through bore 61. The hub flange 59a has force-fitting holes 67 at a plurality of circumferential locations thereof for receiving corresponding hub bolts 66. The outboard member 59 has a cylindrical pilot portion 63 for guiding a drive wheel and brake components (both not shown), which is located in the vicinity of the root of the hub flange 59a of the outboard member 59 and is protruding towards the outboard side. A cap 68 closing an outboard end of the through bore 61 is fitted to an inner periphery of the pilot portion 63.

The illustrated motor unit 6 includes a radial-gap type, IPM motor (e.g., an Interior Permanent Magnet synchronous motor) that includes a motor stator 73 fitted to a cylindrical motor housing 72 and also includes a motor rotor 75 mounted to the rotational output shaft 74, with a radial gap provided between the motor stator 73 and the motor rotor 75. The rotational output shaft 74 is cantilevered via two bearings 76 to a cylindrical segment of the inboard housing 83a of the reducer unit 7.

Figure 6:
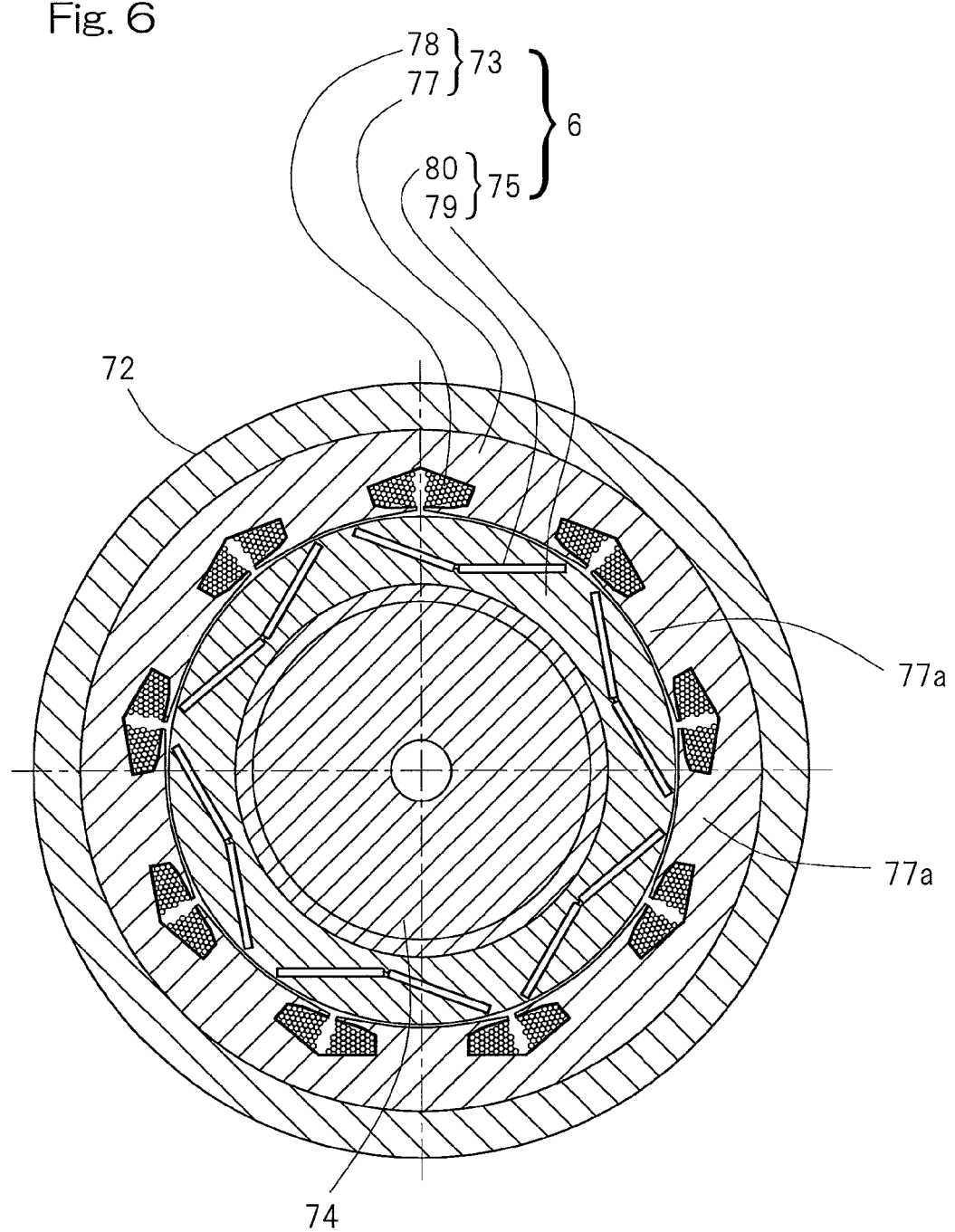
FIG. 6 is a longitudinal cross sectional view of FIG. 5 taken along the line VI-VI, illustrating a motor.

FIG. 6 shows a longitudinal cross sectional view of a motor (taken along the line VI-VI in FIG. 5). The motor rotor 75 of the motor unit 6 may include a rotor core body 79 made of soft magnetic material and may also include a permanent magnet structure 80 incorporated in the rotor core body 79. The permanent magnet structure 80 may include permanent magnets including pairs of two neighboring opposed permanent magnets arranged in circular fashion in the rotor core body 79, where, in each of the pairs, the distance between two neighboring opposed permanent magnets increases along a length of the opposed permanent magnets, as viewed in a cross section thereof The permanent magnet structure 80 may include a neodymium magnet. The motor stator 73 may include a stator core body 77 made of soft magnetic material and may also include coils 78. The stator core body 77 has a ring-shaped outer peripheral surface having a circular cross section. The stator core body 77 also has an inner peripheral surface having a circumferentially arranged plurality of teeth 77a formed therein that are protruding radially inwards. The coils 78 are wound around the corresponding teeth 77a of the stator core body 77.

The motor unit 6 as shown in FIG. 5 is associated with an angle sensor 36 configured to sense a rotational angle of the motor rotor 75 relative to the motor stator 73. The angle sensor 36 includes an angle sensor body 70 configured to sense signals representing a rotational angle of the motor rotor 75 relative to the motor stator 73 for output and also includes an angle calculation circuit 71 configured to calculate a rotational angle based on the signals produced from the angle sensor body 70. The angle sensor body 70 includes a detectable element 70a associated with the outer peripheral surface of the rotational output shaft 74 and also includes a detector element 70b associated with the motor housing 72. For example, the detector element 70b may be positioned adjacent the detectable element 70a in a radially opposed fashion. The detectable element 70a and the detector element 70b may be positioned adjacent each other in an axially opposed fashion. Here, the angle sensor 36 may include a resolver. To maximize the efficiency of the illustrated motor unit 6, a motor drive controller 33 of a motor control circuitry 29 may be configured to control the timings at which respective phase alternating currents are supplied to the coils 78 of the motor stator 73, based on the rotational angle of the motor rotor 75 relative to the motor stator 73 as sensed by the angle sensor 36.

A connector 99 may be formed at the motor housing 72 for connection of the wires for a motor current in the in-wheel motor drive system 8, wires for various sensors, wires for various commands, and etc.

Figure 7:
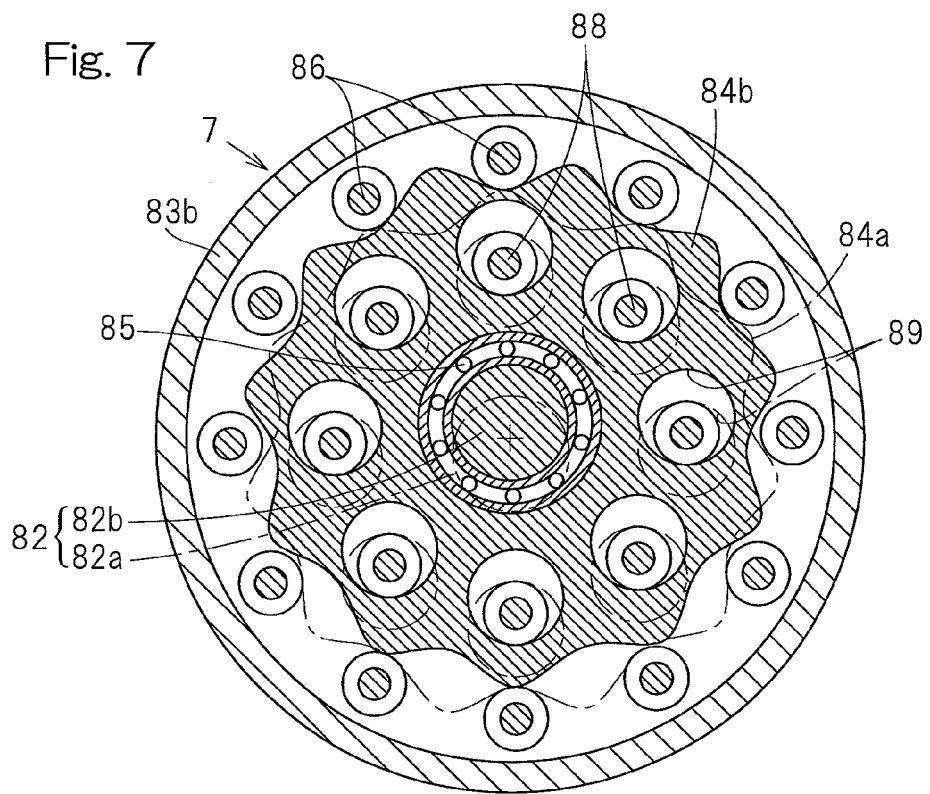
FIG. 7 is a longitudinal cross sectional view of FIG. 5 taken along the line VII-VII, illustrating a reducer.

The illustrated reducer unit 7 includes a cycloidal reducer as described. As shown in FIG. 7, the cycloidal reducer includes two curvilinear plates 84a, 84b, each having an outer contour defined by a smoothly corrugated trochoidal curve, that are mounted via respective bearings 85 to the eccentric segments 82a, 82b of the rotational input shaft 82. A plurality of outer pins 86 are fitted to the housing 83b to directly or indirectly guide, along the outer peripheries thereof, the eccentric motions of the curvilinear plates 84a and 84b. A plurality of inner pins 88, which are fitted to the inboard member 60 of the inner member 52, are inserted to a plurality of corresponding, round through holes 89 formed in each of the curvilinear plates 84a and 84b, to directly or indirectly engage with the through holes 89. The rotational input shaft 82 is splinedly connected to the rotational output shaft 74 of the motor unit 6 for co-rotation. The rotational input shaft 82 is supported on both sides thereof, via two bearings 90, by an inboard housing 83a and by an inner diameter surface of the inboard member 60 of the inner member 52.

Rotation of the rotational output shaft 74 of the motor unit 6 causes the curvilinear plates 84a, 84b, associated with the rotational input shaft 82 that co-rotates with the rotational output shaft 74, to make eccentric motions. The eccentric motions of the curvilinear plates 84a, 84b are, through the inner pins 88 directly or indirectly engaging with the through holes 89, transmitted in the form of a rotary motion to the inner member 52. The speed of rotation of the inner member 52 is reduced with respect to that of rotation of the rotational output shaft 74. For example, a single-stage reducer unit having such a configuration can achieve a reduction ratio of 1/10 or greater.

The two curvilinear plates 84a, 84b are mounted, 180° out of phase with each other, to the eccentric segments 82a and 82b of the rotational input shaft 82, so that the eccentricity of the motions of the curvilinear plates 84a, 84b can be cancelled. Counterweights 91 associated with the respective eccentric segments 82a, 82b, are each disposed at a side of the corresponding one of the eccentric segments 82a, 82b, in such a way that the counterweights 91 face each other across the eccentric segments 82a, 82b while each of the counterweights 91 being displaced in a direction opposite to the direction of displacement of the corresponding one of the eccentric segments 82a, 82b. In this way, vibrations that may be caused by the curvilinear plates 84a, 84b can be cancelled out.

Figure 8:
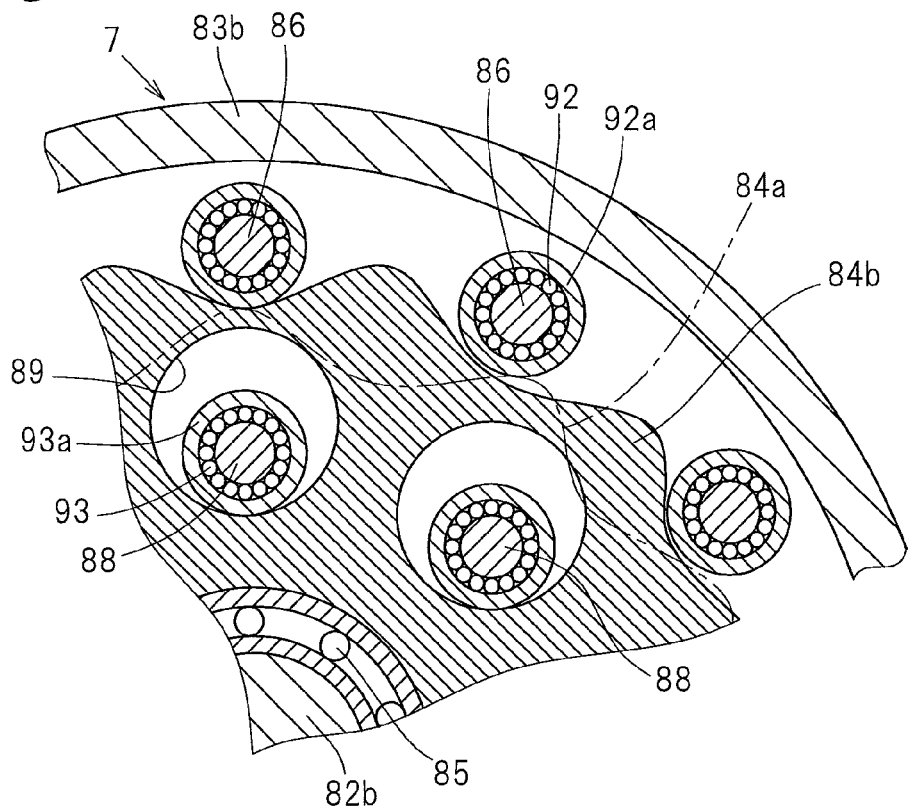
FIG. 8 is a fragmentary enlarged cross sectional view of FIG. 7.

As shown on an enlarged scale in FIG. 8, bearings 92 and bearings 93 may be fitted to the outer pins 86 and the inner pins 88, respectively. The outer rings 92a of the bearings 92 are in rolling contact with the outer peripheries of the curvilinear plates 84a, 84b, while the outer rings 93a of the bearings 93 are in rolling contact with the inner peripheries of the through holes 89. This can minimize the contact friction between the outer pins 86 and the outer peripheries of the curvilinear plates 84a, 84b and the contact friction between the inner pins 88 and the inner peripheries of the through holes 89, thus allowing for smoother transmission of the eccentric motions of the curvilinear plates 84a, 84b in the form of a rotary motion to the inner member 52.

The wheel bearing unit 4 of the in-wheel motor drive system 8 as shown in FIG. 5 is secured to a vehicle body through the connection between a suspension system (not shown) such as a knuckle and the housing 83b of the reducer unit 7 or an outer periphery of the housing 72 of the motor unit 6.

A control system will be briefly discussed. A control system U1 as shown in FIG. 1 includes an ECU 21 which is an electronic control unit configured to perform general control of the vehicle and an inverter unit 22 configured to perform control of the traction motor units 6, 6 according to commands from the ECU 21. The vehicle body 1 is equipped with the ECU 21, the inverter unit 22, and a braking controller unit 23. The ECU 21 may include a computer, programs that may be executed by the computer, and various electronic circuits.

The ECU 21 may be generally divided, in terms of their functions, into a drive control subunit 21a and a general control subunit 21b. The drive control subunit 21a is configured to generate an accelerating/decelerating command, which will influence the traction motor units 6, 6 of the left and right wheels, based on an accelerating signal produced from an accelerator manipulation unit 16, a decelerating signal produced from a brake manipulation unit 17, and a cornering signal produced from the steering angle sensor 15, and to send the accelerating/decelerating command to the inverter unit 22. In addition, the drive control subunit 21a may be configured to correct the accelerating/decelerating command, based on information indicating the rotational frequency of tire(s) produced from rotation sensor(s) 24 that is/are operatively associated with the wheel bearing units 4, 5 for the respective wheels 2, 3 and/or information produced from various sensors that may be mounted to the vehicle. The accelerator manipulation unit 16 includes an accelerator pedal and a sensor 16a configured to sense the depression of the accelerator pedal to generate the aforementioned accelerating signal. The brake manipulator unit 17 includes a brake pedal and a sensor 17a configured to sense the depression of the brake pedal to generate the aforementioned decelerating signal.

The general control subunit 21b of the ECU 21 is configured to send the decelerating command produced from the brake manipulator unit 17 to the braking controller unit 23, control various auxiliary systems 25, process input signals from an operation panel 26 on a console, cause a display 27 to show information, and/or etc. Examples of the auxiliary systems 25 include an air conditioner, a lamp, a wiper, a GPS, and an airbag. In FIG. 1, the auxiliary systems 25 are indicated in general by a single block.

The braking controller unit 23 is configured to send a braking command to the brakes 9, 10 equipped to the wheels 2, 3, according to the decelerating command received from the ECU 21. Commands related to braking produced from the ECU 21 may include, other than commands generated based on the decelerating signal produced from the brake manipulator unit 17, a command generated by a safety enhancement subunit that may be included in the ECU 21. The braking controller unit 23 may also include an anti-lock-braking system. The braking controller unit 23 may include electronic circuits and/or a microcomputer.

The inverter unit 22 includes a power circuitry 28, which may be provided one for each of the motor units 6, and a motor control circuitry 29 configured to control the power circuitry/circuitries 28. A common motor control circuitry 29 may be provided for different power circuitries 28. Independent motor control circuitries 29 may be provided for respective different power circuitries 28. Such a common motor control circuitry 29 will be configured to control the different power circuitries 28 independently of each other, for example, to achieve different motor torques. The motor control circuitry 29 may be configured to send various information related to the in-wheel motor 8 (which may be referred to as "IWM system information") held by the motor control circuitry 29, such as a variety of detected values or various control values, to the ECU.

Figure 2:
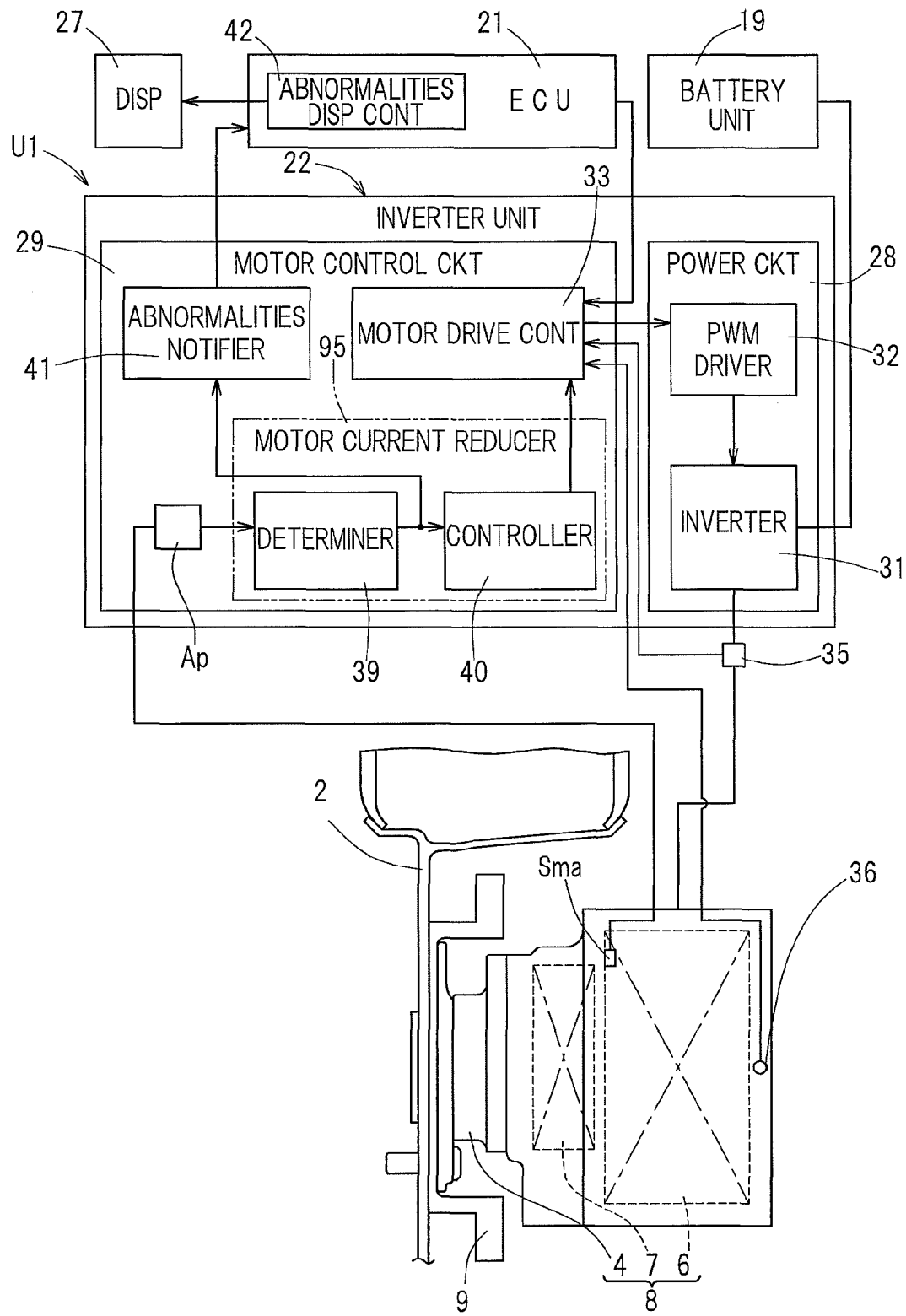
FIG. 2 is a block diagram of a schematic configuration of several features including an inverter unit for the electric vehicle shown in FIG. 1.

FIG. 2 is a block diagram of a schematic configuration of several features including the inverter unit 22. The illustrated power circuitry 28 include an inverter 31 configured to convert a DC power from a battery unit 19 into a three-phase AC power used to drive the motor unit 6 and also include a PWM driver 32 configured to control the inverter 31. The motor unit 6 may include a three-phase synchronous motor. The inverter 31 may include a plurality of semiconductor switching devices (not shown). The PWM driver 32 may be configured to perform pulse width modulation on a received current command by generating ON/OFF commands to the semiconductor switching devices.

The motor control circuitry 29 may include a computer, programs that may be executed by the computer, and various electronic circuits. The motor control circuitry 29 may include a motor drive controller 33 which serves as a basic control component. The motor drive controller 33 may be configured to receive the accelerating/decelerating command such as a torque command from the ECU which serves as an upper-level control unit, convert the accelerating/decelerating command into a current command, and send the current command to the PWM driver 32 of the power circuitry 28. The motor drive controller 33 may be configured to obtain a motor current that flows from the inverter 31 to the motor unit 6, with a current sensor 35, and perform a current feedback control. The motor drive controller 33 may be configured to obtain a rotational angle of the motor unit 6, with an angle sensor 36, and perform a vector control.

In the embodiment under discussion, the motor control circuitry 29 may include a motor current reducer 95 and an abnormalities notifier 41, and the ECU 21 may include an abnormalities display controller 42, as described below. Furthermore, a temperature sensor Sma may be associated with the motor coils 78 (FIG. 5) of the motor unit 6, which is configured to sense temperature Tmc of the motor coils 78.

The motor current reducer 95 may reduce a motor current of the motor unit 6. The motor current reducer 95 may, if the temperature Tmc of the motor coils 78 sensed by the temperature sensor Sma exceeds a predefined motor coils temperature threshold, reduce a motor current of the motor unit 6 until a derivative dTmc/dt of the sensed temperature Tmc with time t drops to zero or below. In particular, the motor current reducer 95 may include a determiner 39 and a controller 40.

Figure 3:
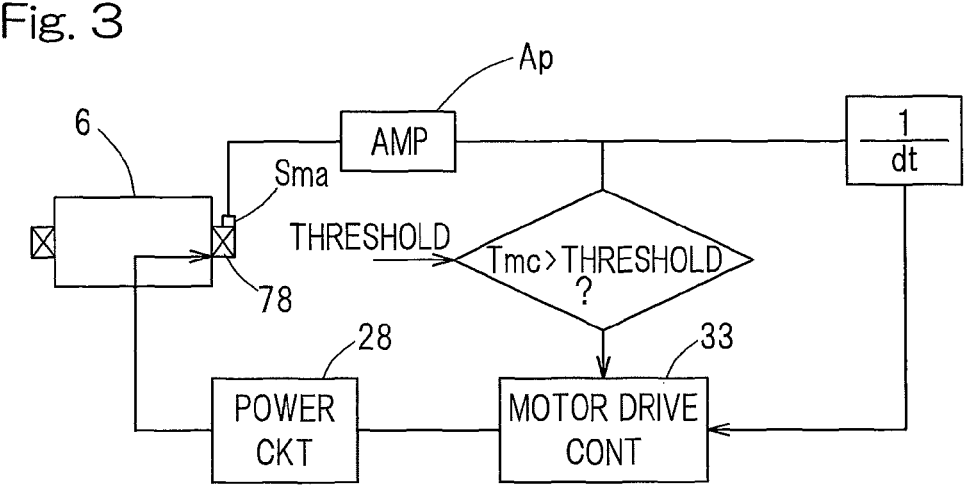
FIG. 3 is a block diagram of a controllers segment for the electric vehicle shown in FIG. 1.

The temperature sensor Sma may include a thermistor. Such a thermistor may be fixed in contact with the motor coils 78 to sense the temperature Tmc of the motor coils 78. In the example under discussion, such as shown in FIG. 2 and FIG. 3, a thermistor may produce a sensed value that is subsequently amplified by an amplifier Ap, and the determiner 39 may make determination based on the resulting value.

The determiner 39 may continuously determine if the temperature Tmc sensed by the temperature sensor Sma exceeds a predefined motor coils temperature threshold. Such a threshold can be appropriately selected based on a relationship between time and the temperature of the motor coils 78 at which insulation on the motor coils deteriorates. Such a relationship may be determined in advance through experiments and/or simulations. Whether insulation on the motor coils 78 has deteriorated may be determined based on comparison of an actual motor current for a given motor voltage applied to the motor unit 6 with a normal value of the motor current for the given motor voltage where insulation on the motor coils 78 does not deteriorate. A motor voltage may be sensed by a voltage sensor (not shown) that may be disposed downstream of the current sensor 35. A motor current may be sensed by the current sensor 35. A motor coils temperature threshold that may be defined in this way may be stored in a memory (not shown) in a rewritable manner as a table.

The controller 40 may, if it is determined that the sensed temperature Tmc of the motor coils 78 exceeds a predefined motor coils temperature threshold, send through the motor drive controller 33 to the power circuitry 28 a command that reduces a motor current of the motor unit 6. The motor current may be reduced by a predefined proportion (e.g., 90%) or by a predefined value. Subsequently, the controller 40 may, upon detecting the sign that the rate of change of the sensed temperature Tmc is dropping to zero or below or if the rate of increase of the temperature represented by the aforementioned dTmc/dt drops to zero or below, stop carrying out the control that reduces the motor current, without waiting for the sensed temperature Tmc itself to drop down to a certain value. This prevents drastic hindrance of the driving of the motor unit 6. The aforementioned dTmc/dt dropping to zero or below is equivalent to the slope of the temperature Tmc at a given moment being zero or below. The temperature of the motor coils 78 may not drop so quickly. Hence, waiting for a certain drop of the temperature to be achieved by reducing a motor current would result in drastic hindrance of the driving of the motor unit 6, thus hindering the driving of the vehicle. In contrast, the aforementioned configuration of stopping carrying out control that reduces a motor current upon detecting the sign that the temperature has started to drop can prevent various problems that may be caused by drastic hindrance of the driving of a motor unit 6.

Where the sensed temperature Tmc of the motor coils 78 begins to increase after the motor current reducer 95 stops carrying out the aforementioned control, the motor current reducer 95 may, if the sensed temperature Tmc is equal or greater than the motor coils temperature threshold, resume carrying out the control that reduces the motor current of the motor unit 6. This ensures that overload is avoided, in a configuration where the motor current reducer 95 may, if the aforementioned rate of increase of the temperature drops to zero or below, stop carrying out the control that reduces the motor current. In particular, refer to characteristic diagrams of FIG. 4A and FIG. 4B, each showing a relationship between time t and the temperature Tmc of motor coils 78 of a motor unit 6 for the illustrated electric vehicle.

Figure 4A:
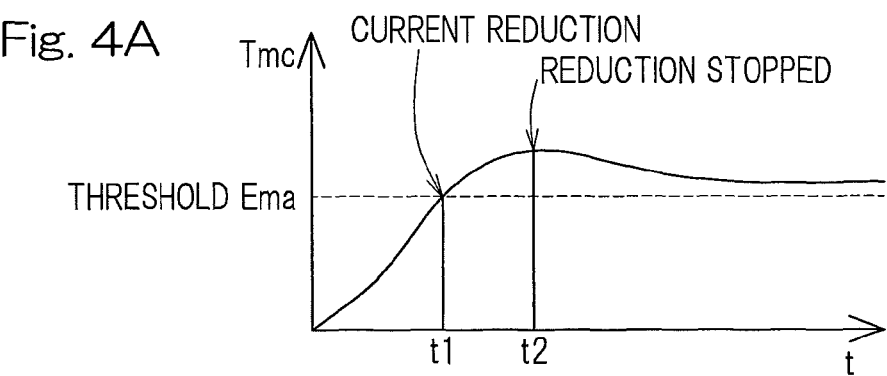
FIG. 4A is a characteristic diagram showing a relationship between time and the temperature of motor coils of a motor unit for the electric vehicle shown in FIG. 1.

Referring to FIG. 4A, the temperature Tmc of the motor coils 78 may begin to increase, and at time t1, the determiner 39 may determine that the temperature Tmc of the motor coils 78 exceeds a motor coils temperature threshold Ema. The controller 40 may, in response to such a determination result, send through the motor drive controller 33 to the power circuitry 28 a command that reduces a motor current of the motor unit 6. In particular, the motor drive controller 33 may, in response to such a command received from the controller 40, send to the PWM driver 32 of the power circuitry 28 a current command that causes a current supplied to the motor unit 6 to be reduced.

At time t2 where the rate of increase of the temperature represented by the aforementioned dTmc/dt drops to zero (i.e., the sensed temperature Tmc becomes static), the controller 40 may stop carrying out control that reduces a motor current of the motor unit 6. In the example as shown in FIG. 4A, after the time t2, the aforementioned dTmc/dt stays negative (i.e., the sensed temperature Tmc continues to drop). Thus, the controller 40 may, even though the sensed temperature Tmc still exceeds or equals the motor coils temperature threshold Ema, stop carrying out control that reduces a motor current, without waiting for the sensed temperature Tmc itself to drop to the motor coils temperature threshold Ema or below.

Figure 4B:
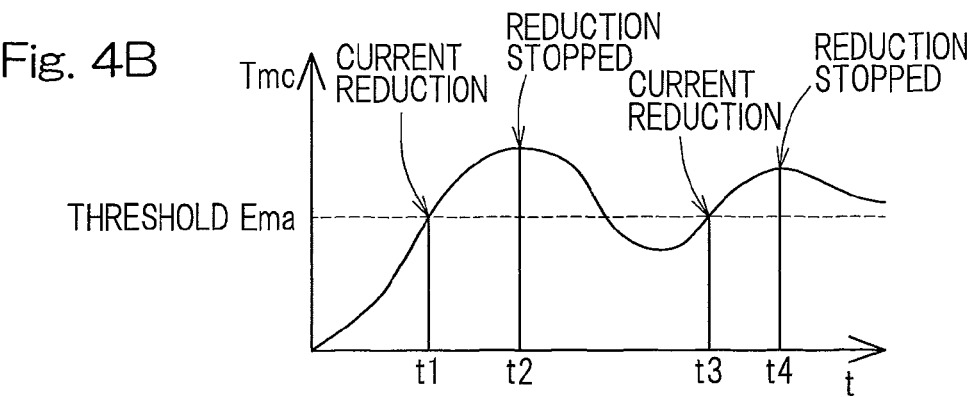
FIG. 4B is another characteristic diagram showing a relationship between time and the temperature of motor coils of a motor unit for the electric vehicle shown in FIG. 1.

Referring to FIG. 4B, at time t1, the controller 40 may, in response to a determination result produced from the determiner 39, send through the motor drive controller 33 to the power circuitry 28 a command that reduces a motor current of the motor unit 6. After time t2 where the motor current reducer 95 stops carrying out control that reduces a motor current, the sensed temperature Tmc of the motor coils 78 may begin to increase. At time t3, the controller 40 may, in response to the determination that the sensed temperature Tmc equals or exceeds the motor coils temperature threshold, resume carrying out control that reduces a motor current of the motor unit 6. Subsequently, the controller 40 may, if the rate of increase of the temperature drops to zero or below, stop carrying out control that reduces a motor current. This ensures that overload is avoided.

The abnormalities notifier 41 as shown in FIG. 2 may be configured to send information indicating abnormalities to the ECU 21, if the determiner 39 determines that the sensed temperature Tmc exceeds the motor coils temperature threshold.

The abnormalities display controller 42, which may be included in the ECU 21, may be configured to, in response to the information indicating abnormalities of the motor unit 6 produced from the abnormalities notifier 41, cause a vehicle driver display 27 to show a presentation that indicates abnormalities. The presentation that can be shown on the display 27 may include a presentation with letters and/or symbols, such as an icon.

The following advantages or effects may be achieved. In the aforementioned configuration, the temperature sensor Sma may continuously sense the temperature Tmc of the motor coils 78. The electric vehicle may be driven for a continuous time with a higher torque in order to, for example, go up a slope. This can lead to increase in the temperature Tmc of the motor coils 78. The determiner 39 may determine if the sensed temperature Tmc exceeds a predefined motor coils temperature threshold. The controller 40 may, if it is determined that the sensed temperature Tmc exceeds the motor coils temperature threshold, send to the power circuitry 28 a command that reduces a motor current of the motor unit 6. Subsequently, the controller 40 may, upon detecting the sign that the rate of change of the sensed temperature Tmc is dropping to zero or below or if the rate of increase of the temperature represented by the aforementioned dTmc/dt drops to zero or below, stop carrying out the control that reduces the motor current, without waiting for the sensed temperature Tmc itself to drop down to a certain value. This prevents drastic hindrance of the driving of the motor unit 6.

If the sensed temperature Tmc of the motor coils 78 begins to increase once the motor current reducer 95 stops carrying out the aforementioned control, the motor current reducer 95 may, once the sensed temperature Tmc equals or exceeds the motor coils temperature threshold, resume carrying out the control that reduces the motor current of the motor unit 6. Subsequently, the motor current reducer 95 may, if the aforementioned rate of increase of the temperature drops to zero or below, stop carrying out the control that reduces the motor current. This ensures that overload is avoided.

In the aforementioned configuration, the motor control circuitry 29 of the inverter unit 22 includes the motor current reducer 95. In this way, the motor current reducer 95 that may make the aforementioned determination based on the sensed temperature is positioned closer to the motor unit 6 than in a configuration where the ECU 21 includes the motor current reducer 95, thus the former configuration being more advantageous in terms of wire routing. Also, with the former configuration, an appropriate control can be initiated more quickly than with a configuration of the ECU 21 including the motor current reducer 95, thus promptly avoiding various driving problems. Furthermore, with the former configuration, the load on the ECU 21, whose complexity is increasing hand-in-hand with its sophistication, can be reduced.

The ECU 21 performs general, integrated control of the vehicle. Thus, by sending to the ECU 21 a notification of abnormalities of the motor unit 6 if it is found, with the motor current reducer 95 that may be included in the inverter unit 22, that there is abnormalities of the motor coils 78, the ECU 21 can correspondingly perform an appropriate control of the vehicle in general. Also, the ECU 21 is an upper-level control unit which may send a drive command to the inverter unit 22. Thus, an urgent control performed by the inverter unit 22 may be followed by a more appropriate control of drive which is performed by the ECU 21.

Reliability of the wheel bearing unit 4, the reducer unit 7 and the motor unit 6 is an urgent concern for an in-wheel motor drive system 8 which, due to its smaller size, has less materials used, involves rapid rotation of the motor unit 6, and etc. Sensing the temperature of the motor coils 78 and continuously monitoring the motor coils 78 for abnormalities such as deterioration of insulation enables responsive control that appropriately reduces the motor current of the motor unit 6.

In the aforementioned configuration, the reducer unit 7 in the in-wheel motor drive system 8 includes a cycloidal reducer having, for example, a reduction ration of 1/6 or greater. This allows for the provision of a smaller motor unit 6, thus achieving reduction in dimensions of the system or assembly. With such a significant reduction ratio, a smaller motor unit 6 may involve rapid rotation. Even when a motor unit 6 is undergoing rapid rotation, early detection of abnormalities such as deterioration of insulation on the motor coils 78 of the motor unit 6 can be realized, thus enabling appropriate measures to be promptly taken.

Figure 9:
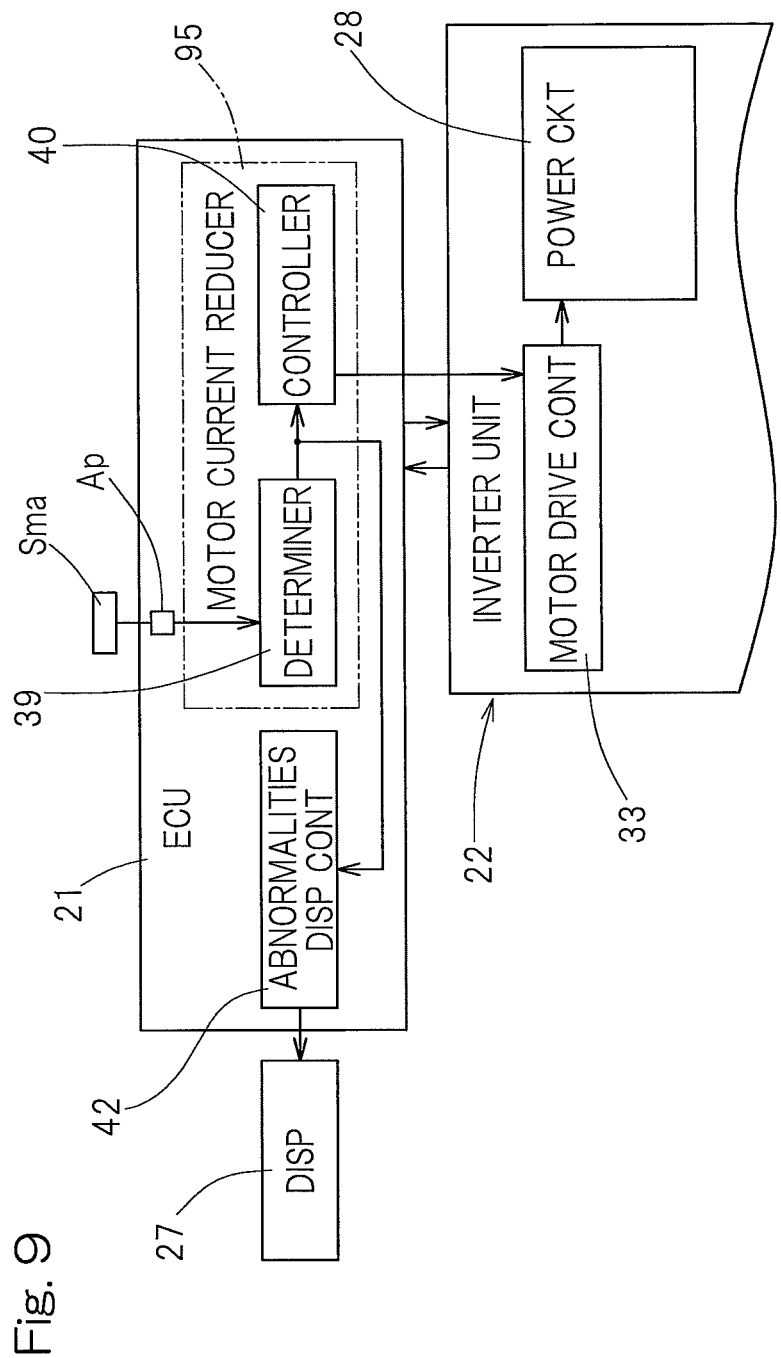
FIG. 9 is a block diagram of a schematic configuration of several features including an ECU, of an electric vehicle according to the second embodiment of the present invention.

The motor current of the motor unit 6 may be reduced by a predefined proportion. For example, the motor current of the motor unit 6 may be reduced, after every certain period of time, by a certain percentage relative to the original motor current. For another example, the proportion by which the motor current of the motor unit may be reduced may, after every certain period of time, be incremented. As shown in FIG. 9 which illustrates an electric vehicle according to the second embodiment, the ECU 21 which is an electronic control unit configured to perform general control of the vehicle may include the motor current reducer 95.

An electric vehicle according to the third embodiment and the fourth embodiment of the present invention will be discussed below. Note that those features corresponding to the features already described with reference to the preceding embodiment(s) will be given the same reference signs and will not be described. In the discussion of a given configuration where only certain features are described, the remaining non-described features should be considered as the same as those already described with reference to the preceding embodiment(s). Also note that beside the combinations of the features described in detail with reference to a certain embodiment, various embodiments themselves can be partially combined with each other unless such combinations are inoperable.

Figure 10:
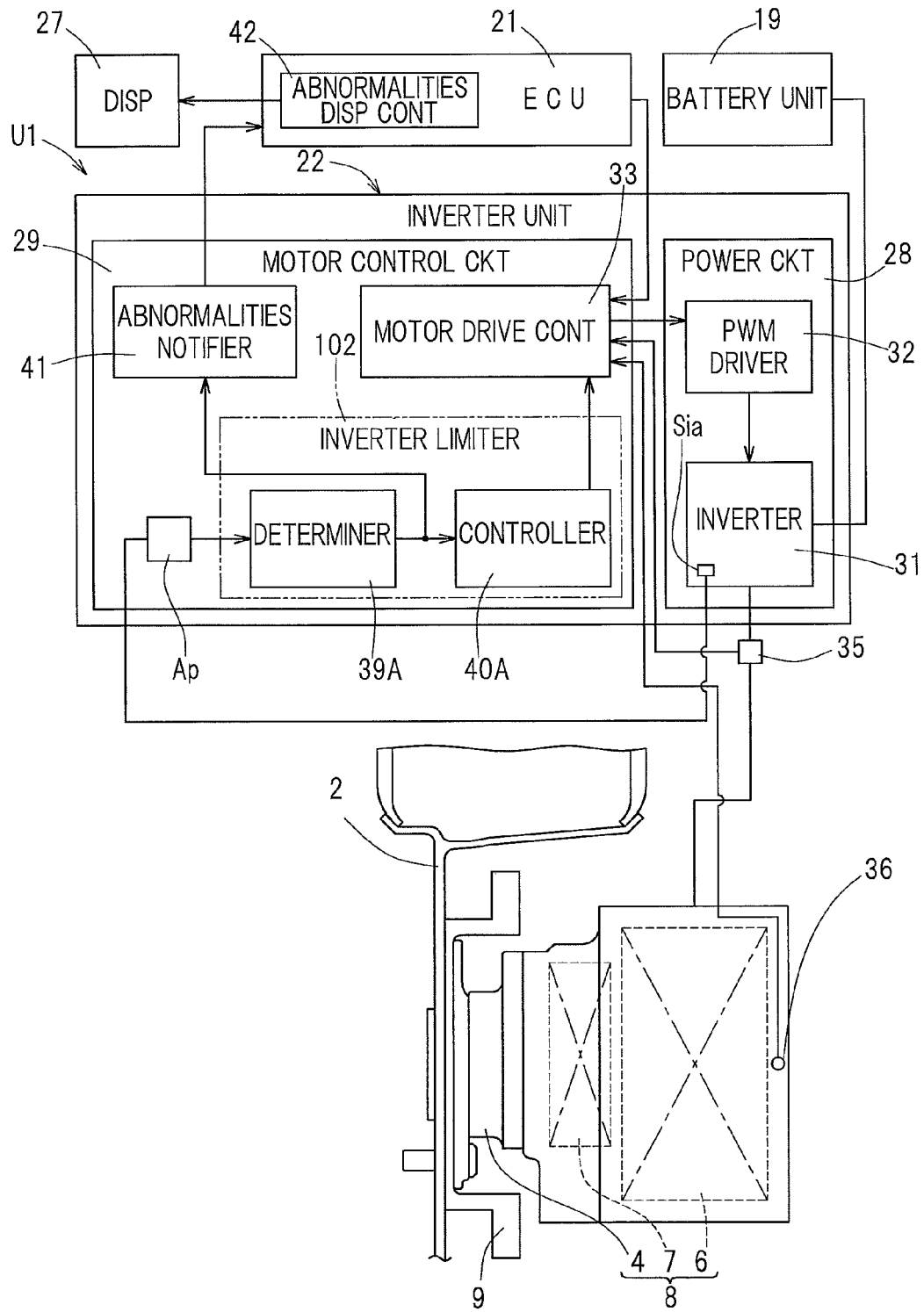
FIG. 10 is a block diagram of a schematic configuration of several features including an inverter unit, of an electric vehicle according to the third embodiment of the present invention.

Referring to the block diagram of FIG. 10, a schematic configuration of several features including an inverter unit, of an electric vehicle according to the third embodiment of the present invention will now be described. In the embodiment under discussion, the motor control circuitry 29 may include an inverter limiter 102, which will be described below, as well as an abnormalities notifier 41, and the ECU 21 may include an abnormalities display controller 42. Furthermore, a temperature sensor Sia may be associated with the inverter 31, which is configured to sense temperature Tic of the inverter 31. The inverter limiter 102 may limit a current command to the inverter 31. The inverter limiter 102 may, upon determining that the temperature Tic of the inverter 31 sensed by the temperature sensor Sia exceeds a predefined inverter temperature threshold, limit a current command to the inverter 31 until a derivative dTic/dt of the sensed temperature Tic with time t drops to zero or below. In particular, the inverter limiter 102 may include a determiner 39A and a controller 40A.

Figure 11:
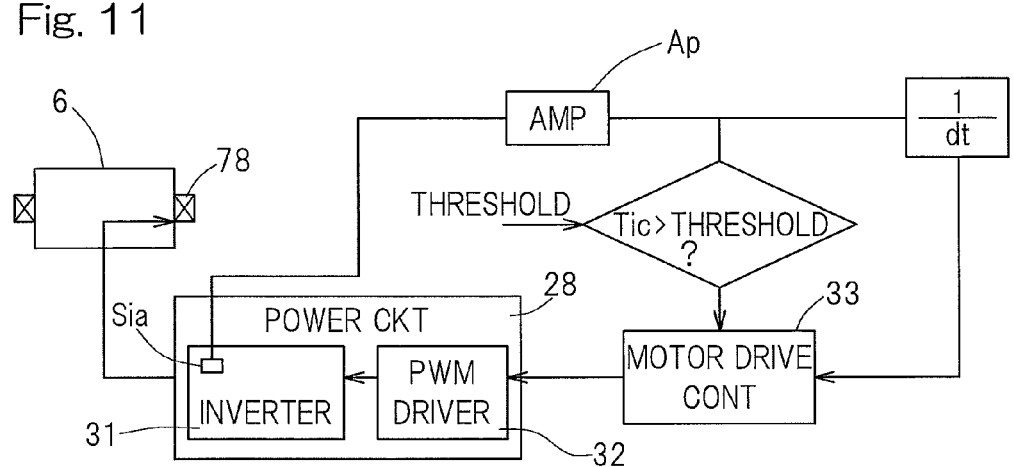
FIG. 11 is a block diagram of a controllers segment for the electric vehicle shown in FIG. 10.

The temperature sensor Sia may include a thermistor. Such a thermistor may be fixed in contact with a substrate to which a plurality of semiconductor switching devices may be mounted, to sense the temperature Tic of the inverter 31. A thermistor may be fixed to the semiconductor switching devices. In the example under discussion, such as shown in FIG. 10 and FIG. 11, a thermistor may produce a sensed value that is subsequently amplified by an amplifier Ap, and the determiner 39A may make determination based on the resulting value.

The determiner 39A may continuously determine if the temperature Tic sensed by the temperature sensor Sia exceeds a predefined inverter temperature threshold. Such a threshold may be the nominal operating temperature of semiconductor switching devices used. The threshold can be appropriately selected based on a relationship between time and the temperature of the inverter 31 at which undesirable change in the characteristics of the inverter 31 occurs. Such a relationship may be determined in advance through experiments and/or simulations. An inverter temperature threshold that may be defined in this way may be stored in a memory (not shown) in a rewritable manner as a table.

The controller 40A may, if it is determined that the sensed temperature Tic of the inverter 31 exceeds a predefined inverter temperature threshold, send through the motor drive controller 33 to the power circuitry 28 a command that limits a current command to the inverter 31. In particular, the motor drive controller 33 may receive an accelerating/decelerating command from the ECU 21, convert the accelerating/decelerating command into a current command, and send the current command to the PWM driver 32. The motor drive controller 33 may, in response to the aforementioned command received from the controller 40A, limit such a current command.

More specifically, the controller 40A may carry out control that causes change in at least one of duty cycle and pulse number. For example, the control that limits a current command to the inverter 31 may include reduction of a duty cycle, which indicates pulse ON time per switching period, below a predefined duty cycle by several tens of percent relative to the predefined duty cycle, thus reducing effective voltage value, or may include generation of pulses of unequal width while maintaining a switching period.

Subsequently, the controller 40A may, upon detecting the sign that the rate of change of the sensed temperature Tic is dropping to zero or below or if the rate of increase of the temperature represented by the aforementioned dTic/dt drops to zero or below, stop carrying out the control that limits a current command to the inverter 31, without waiting for the sensed temperature Tic itself to drop down to a certain value. This can avoid excessive reduction of a motor current, thus preventing drastic hindrance of the driving of the motor unit 6. The aforementioned dTic/dt dropping to zero or below is equivalent to the slope of the temperature Tic at a given moment being zero or below.

The temperature of the inverter 31 may not drop so quickly. Hence, waiting for a certain drop of the temperature to be achieved by limiting a current command to the inverter 31—thus by reducing a motor current—would result in drastic hindrance of the driving of the motor unit 6, thus hindering the driving of the vehicle. In contrast, the aforementioned configuration of stopping carrying out control that limits a current command to the inverter 31—thus stopping carrying out control that reduces a motor current of the motor unit—upon detecting the sign that the temperature has started to drop can prevent various problems that may be caused by drastic hindrance of the driving of a motor unit 6.

If the sensed temperature Tic of the inverter 31 begins to increase after the inverter limiter 102 stops carrying out the aforementioned control, the inverter limiter 102 may, once the sensed temperature Tic equals or exceeds the inverter temperature threshold, resume carrying out the control that limits a current command to the inverter 31. Subsequently, the inverter limiter 102 may, if the aforementioned rate of increase of the temperature drops to zero or below, stop carrying out the control that limits a current command to the inverter 31. This ensures that overload is avoided. In this way, the change of characteristics of the inverter 31 and/or a damage to the inverter 31 that may be caused by overheat can be prevented, thus preventing undesirable change in the control characteristics of the driving of the motor unit and/or preventing a situation where the driving of the motor unit is impossible. In particular, refer to characteristic diagrams of FIG. 12A and FIG. 12B, each showing a relationship between time t and the temperature Tic of an inverter 31 for the illustrated electric vehicle.

Figure 12A:
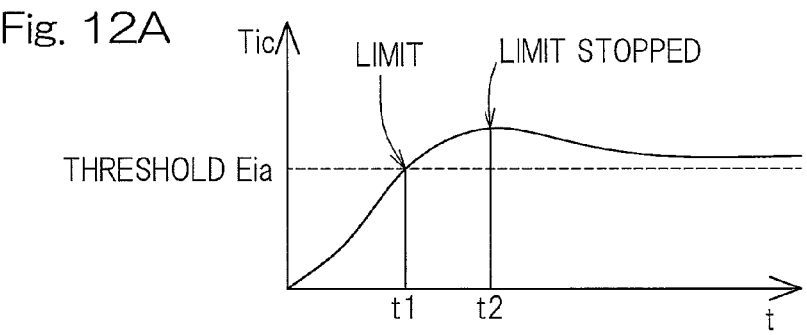
FIG. 12A is a characteristic diagram showing a relationship between time and the temperature of an inverter unit for the electric vehicle shown in FIG. 10.

Referring to FIG. 12A, the temperature Tic of the inverter 31 may begin to increase, and at time t1, the determiner 39A may determine that the temperature Tic of the inverter 31 exceeds an inverter temperature threshold Eia. The controller 40A may, in response to such a determination result, send through the motor drive controller 33 to the power circuitry 28 a command that limits a current command to the inverter 31. In particular, the motor drive controller 33 may, in response to such a command received from the controller 40A, send to the PWM driver 32 of the power circuitry 28 a current command that causes a current supplied to the motor unit 6 to be reduced.

At time t2 where the rate of increase of the temperature represented by the aforementioned dTic/dt drops to zero (i.e., the sensed temperature Tic becomes static), the controller 40A may stop carrying out control that limits a current command to the inverter 31. In the example as shown in FIG. 12A, after the time t2, the aforementioned dTic/dt stays negative (i.e., the sensed temperature Tic continues to drop). Thus, the controller 40A may, even though the sensed temperature Tic still exceeds or equals the inverter temperature threshold Eia, stop carrying out control that limits a current command, without waiting for the sensed temperature Tic itself to drop to the inverter temperature threshold Eia or below.

Figure 12B:
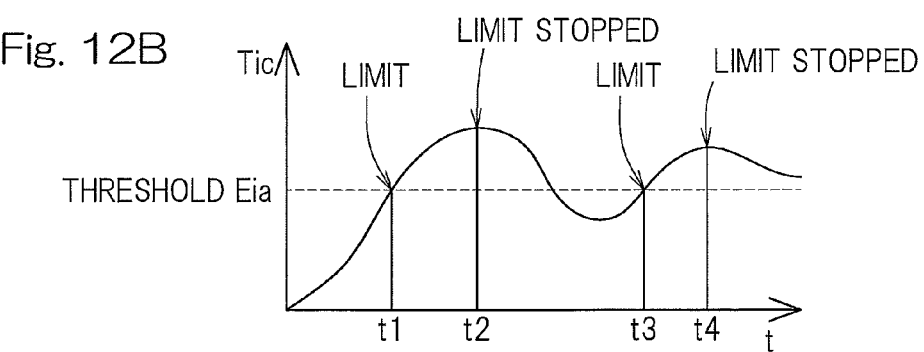
FIG. 12B is another characteristic diagram showing a relationship between time and the temperature of an inverter unit for the electric vehicle shown in FIG. 10.

Referring to FIG. 12B, at time t1, the controller 40A may, in response to a determination result produced from the determiner 39A, send through the motor drive controller 33 to the power circuitry 28 a command that limits a current command to the inverter 31. After time t2 where the inverter limiter 102 stops carrying out control that limits a current command, the sensed temperature Tic of the inverter 31 may begin to increase. At time t3, the controller 40A may, in response to the determination that the sensed temperature Tic equals or exceeds the inverter temperature threshold, resume carrying out control that limits a current command to the inverter 31. Subsequently, the controller 40A may, if the rate of increase of the temperature drops to zero or below, stop carrying out control that limits a current command to the inverter 31. This ensures that overload is avoided.

The following advantages or effects may be achieved. In the aforementioned configuration, the temperature sensor Sia may continuously sense the temperature Tic of the inverter 31. The electric vehicle may be driven for a continuous time with a higher torque in order to, for example, go up a slope. This can lead to increase in the temperature Tic of the inverter 31 as well as increase in the temperature Tmc of the motor coils 78. The determiner 39A may determine if the sensed temperature Tic exceeds a predefined inverter temperature threshold. The controller 40A may, if it is determined that the sensed temperature Tic exceeds the inverter temperature threshold, send to the power circuitry 28 a command that limits a current command to the inverter 31. Subsequently, the controller 40A may, upon detecting the sign that the rate of change of the sensed temperature Tic is dropping to zero or below or if the rate of increase of the temperature represented by the aforementioned dTic/dt drops to zero or below, stop carrying out the control that limits a current command to the inverter 31, without waiting for the sensed temperature Tic itself to drop down to a certain value. This can avoid excessive reduction of a motor current, thus preventing drastic hindrance of the driving of the motor unit 6.

If the sensed temperature Tic of the inverter 31 begins to increase after the inverter limiter 102 stops carrying out the aforementioned control, the inverter limiter 102 may, once the sensed temperature Tic equals or exceeds the inverter temperature threshold, resume carrying out the control that limits a current command to the inverter 31. Subsequently, the inverter limiter 102 may, if the aforementioned rate of increase of the temperature drops to zero or below, stop carrying out the control that limits a current command to the inverter 31. This ensures that overload is avoided. In this way, the change of characteristics of the inverter 31 and/or a damage to the inverter 31 that may be caused by overheat can be prevented, thus preventing undesirable change in the control characteristics of the driving of the motor unit and/or preventing a situation where the driving of the motor unit is impossible.

In the aforementioned configuration, the motor control circuitry 29 of the inverter unit 22 includes the inverter limiter 102. In this way, the inverter limiter 102 that may make the aforementioned determination based on the sensed temperature is positioned closer to the motor unit 6 than in a configuration where the ECU 21 includes the inverter limiter 102, thus the former configuration being more advantageous in terms of wire routing. Also, with the former configuration, an appropriate control can be initiated more quickly than with a configuration of the ECU 21 including the inverter limiter 102, thus promptly avoiding various driving problems. Furthermore, with the former configuration, the load on the ECU 21, whose complexity is increasing hand-in-hand with its sophistication, can be reduced.

The ECU 21 performs general, integrated control of the vehicle. Thus, by sending to the ECU 21 a notification of abnormalities of the inverter 31 if it is found, with the inverter limiter 102 that may be included in the inverter unit 22, that there is temperature abnormalities of the inverter 31, the ECU 21 can correspondingly perform an appropriate control of the vehicle in general. Also, the ECU 21 is an upper-level control unit which may send a drive command to the inverter unit 22. Thus, an urgent control performed by the inverter unit 22 may be followed by a more appropriate control of drive which is performed by the ECU 21.

Sensing the temperature of the inverter 31 and continuously monitoring the inverter 31 for abnormalities, such as thermal runaway caused by overheat of semiconductor switching devices enables responsive control that appropriately limits a current command to the inverter 31.

Even when a motor unit 6 is undergoing rapid rotation, the change of characteristics of an inverter 31 and/or a damage to the inverter can be prevented, thus preventing undesirable change in the control characteristics of the driving of the motor unit and/or preventing a situation where the driving of the motor unit is impossible. This enables avoiding a situation where driving of a vehicle is suddenly impossible.

Figure 13:
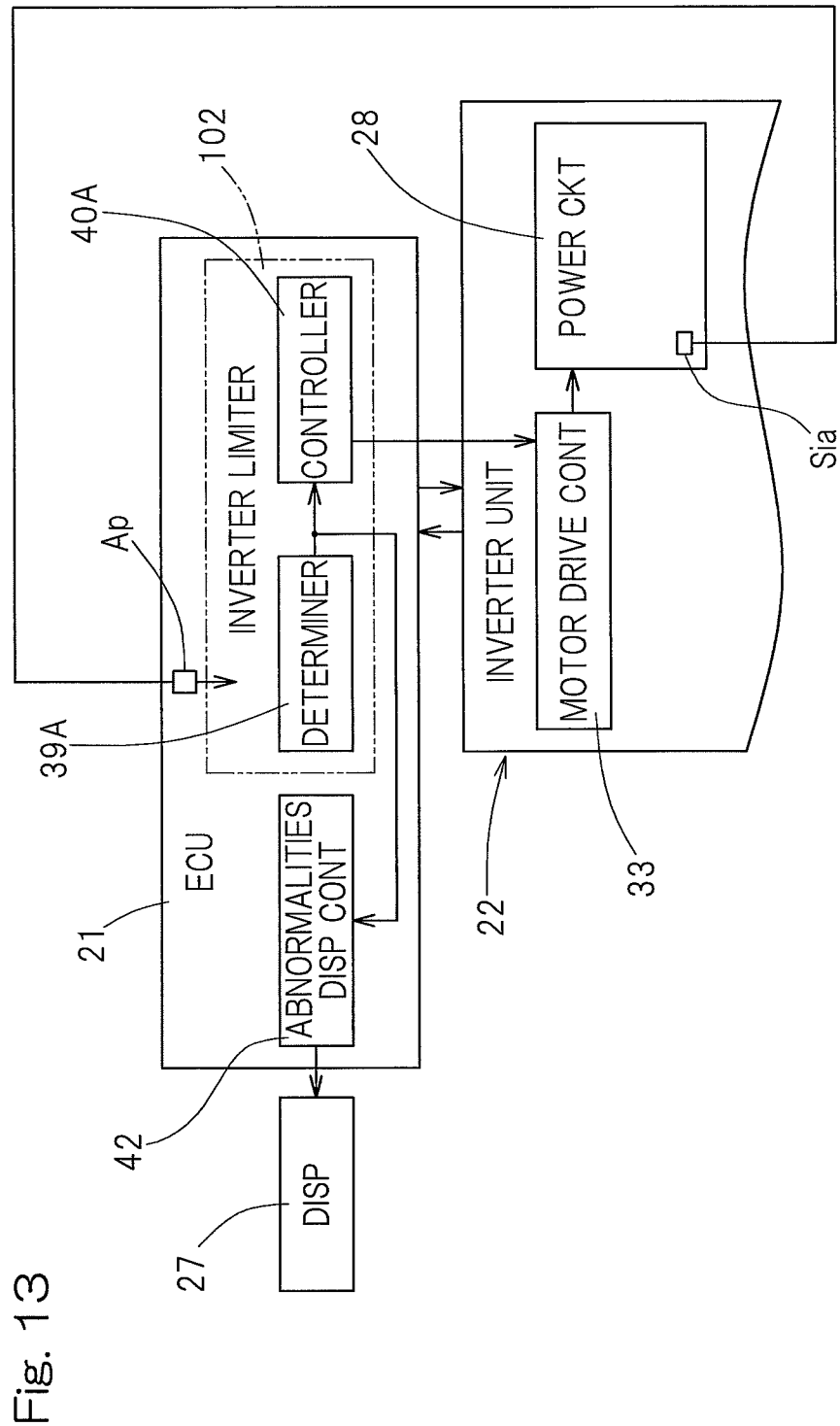
FIG. 13 is a block diagram of a schematic configuration of several features including an ECU, of an electric vehicle according to the fourth embodiment of the present invention.

As shown in FIG. 13 which is similar to FIG. 9 but illustrates an electric vehicle according to the fourth embodiment, the ECU 21 which is an electronic control unit configured to perform general control of the vehicle may include the inverter limiter 102.

Although the present invention has been described in connection with preferred embodiments with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE SIGNS

2: Wheel
4: Wheel bearing unit
6: Motor unit
7: Reducer unit
8: In-wheel motor drive system
19: Battery unit
21: ECU
22: Inverter unit
28: Power circuitry
29: Motor control circuitry
31: Inverter
39: Determiner in motor current reducer
39A: Determiner in inverter limiter
40: Controller in motor current reducer
40A: Controller in inverter limiter
41: Abnormalities notifier
78: Motor coil
95: Motor current reducer
102: Inverter limiter
Sma: Motor temperature sensor
Sia: Inverter temperature sensor
U1: Control system

What is claimed is:

1. An electric vehicle comprising:
a motor unit configured to drive a wheel, the motor unit including motor coils;
a control system that controls the motor unit, the control system including an inverter;
a temperature sensor that is associated with the motor coils of the motor unit and is configured to sense temperature Tmc of the motor coils or a temperature sensor that is associated with the inverter and is configured to sense temperature Tic of the inverter; and
a limiter configured to, if the temperature Tmc sensed by the temperature sensor is equal to or greater than a motor coils temperature threshold, reduce a motor current of the motor unit until a derivative dTmc/dt of the sensed temperature Tmc with time t drops to zero or below, or to, if the temperature Tic sensed by the temperature sensor is equal to or greater than an inverter temperature threshold, limit a current command to the inverter until a derivative dTic/dt of the sensed temperature Tic with time t drops to zero or below,
the limiter being further configured to, when the dTmc/dt or dTic/dt drops to zero or below, stop reducing a motor current of the motor or limiting the current command to the inverter.

2. The electric vehicle as claimed in claim 1, wherein the control system includes an ECU which is an electronic control unit configured to perform general control of the vehicle and also includes an inverter unit, the inverter unit including a power circuitry which includes the inverter and also including a motor control circuitry configured to control at least the power circuitry in accordance with control from the ECU; and
wherein the inverter is configured to convert a DC power from a battery unit into an AC power used to drive the motor unit.

3. The electric vehicle as claimed in claim 2, wherein the motor control circuitry includes the limiter; and
wherein the limiter includes a determiner configured to determine if the temperature sensed by the temperature sensor exceeds the motor coils temperature threshold or the inverter temperature threshold and also includes a controller configured to send to the power circuitry, if it is determined that the sensed temperature exceeds the motor coils temperature threshold or the inverter temperature threshold, a command that reduces the motor current of the motor unit or a command that limits the current command to the inverter.

4. The electric vehicle as claimed in claim 3, wherein the inverter unit includes an abnormalities notifier configured to send to the ECU a notification of abnormalities of the motor unit if the determiner determines that the sensed temperature exceeds the motor coils temperature threshold or a notification of abnormalities of the inverter if the determiner determines that the sensed temperature exceeds the inverter temperature threshold.

5. The electric vehicle as claimed in claim 1, further comprising:
   a wheel bearing unit; and
   a reducer unit;
   wherein the motor unit, together with the wheel bearing unit and the reducer unit, forms an in-wheel motor drive system that is partly or entirely disposed within the wheel.

6. The electric vehicle as claimed in claim 1, further comprising:
   a reducer unit configured to produce rotation with a speed that is reduced with respect to that of rotation of the motor unit,
   wherein the reducer unit comprises a cycloidal reducer.

* * * * *